D. W. SCHMITT.
CULTIVATOR.
APPLICATION FILED DEC. 24, 1920.
1,397,333.
Patented Nov. 15, 1921.
3 SHEETS—SHEET 3.
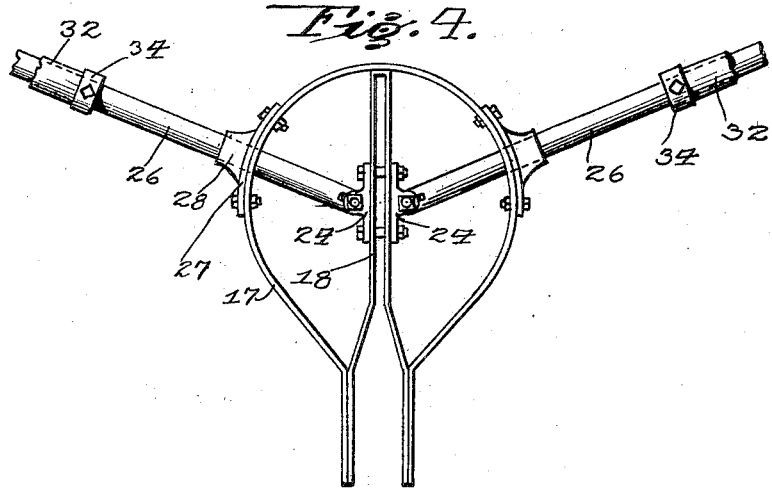
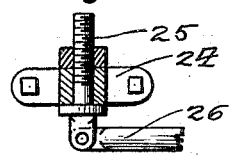
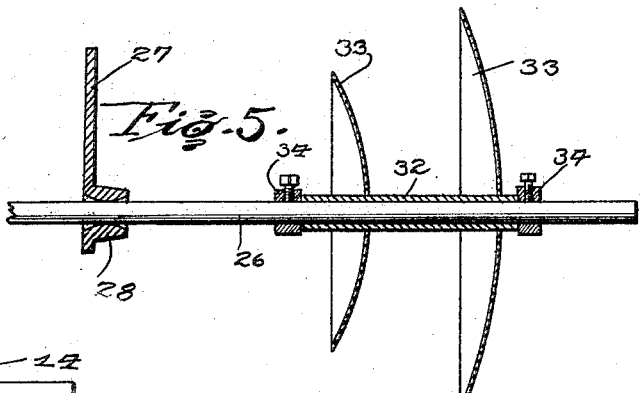
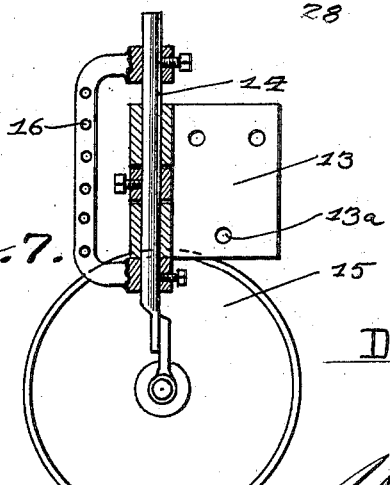
D. W. Schmitt,
INVENTOR.
BY Watson E. Coleman
ATTORNEY.

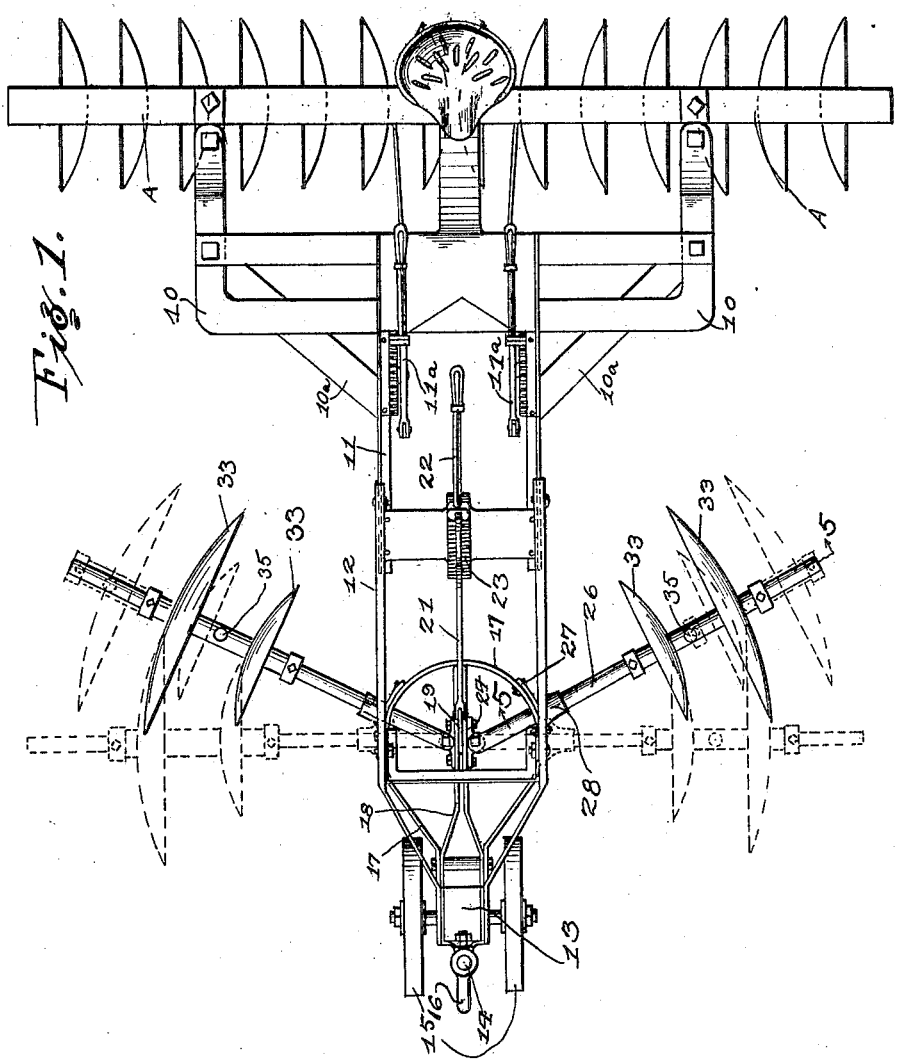

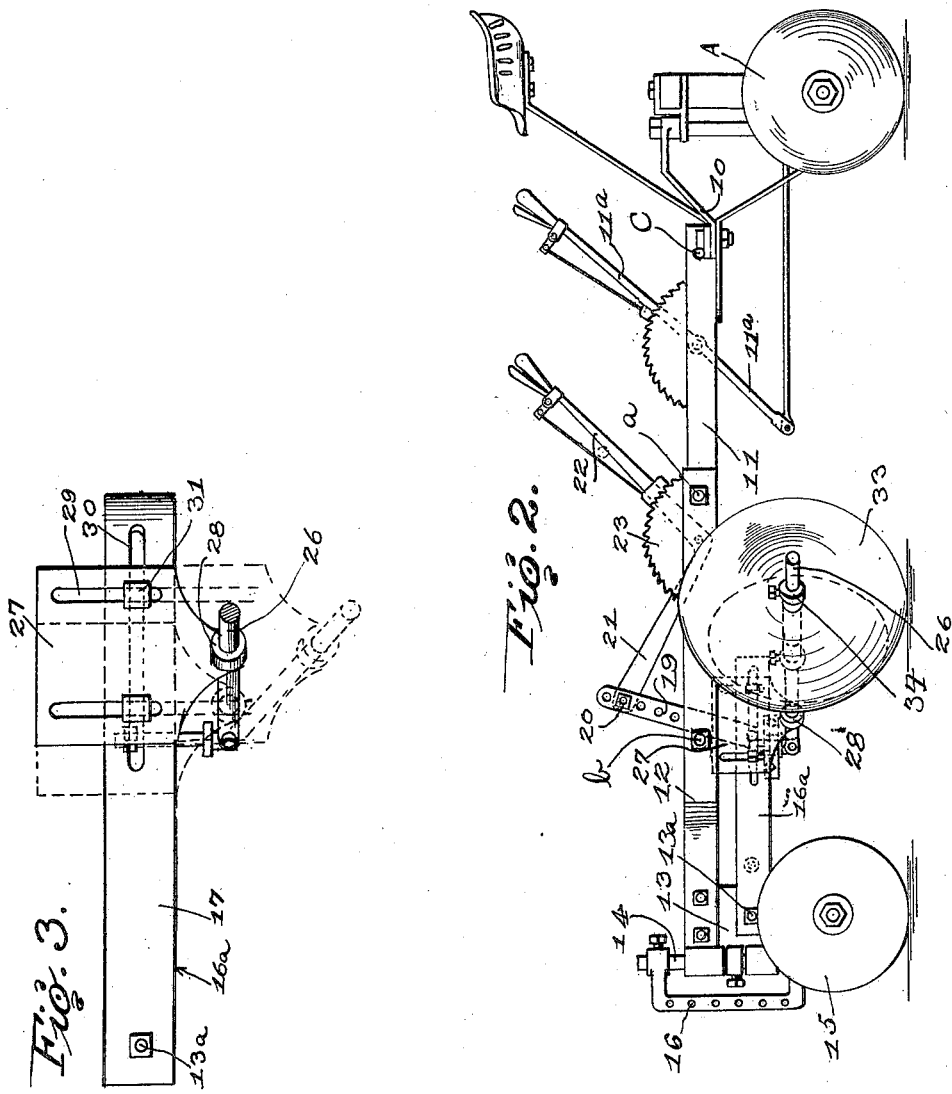

UNITED STATES PATENT OFFICE.

DANIEL W. SCHMITT, OF RENO COUNTY, NEAR KINGMAN, KANSAS.

CULTIVATOR.

1,397,333.  Specification of Letters Patent.  Patented Nov. 15, 1921.

Application filed December 24, 1920. Serial No. 432,997.

*To all whom it may concern:*

Be it known that I, DANIEL W. SCHMITT, a citizen of the United States, residing in Reno county, near Kingman, in the county of Kingman and State of Kansas, have invented certain new and useful Improvements in Cultivators, of which the following is a specification, reference being had to the accompanying drawings.

This invention relates to improvements in cultivators.

An important object of the invention is to provide a cultivator having means for breaking down lister ridges so that the ground may be more evenly laid while cultivating.

A further object of the invention is to provide an attachment for cultivators which may be readily attached thereto and detached from the cultivator and which breaks down ridges in the ground to permit the cultivator to work the ground more evenly. In certain sections of the country, due to the limited rain-fall, the formation of lister ridges for retaining the moisture is resorted to in nearly all instances, and accordingly a device of this character whereby the breaking down of the ridges, an operation ordinarily taking considerable time, is accomplished with a single operation combined with the cultivating of the land, becomes extremely desirable.

A further object of the invention is to provide a device of this character which is simple in construction and which is capable of wide range of adjustability.

Other objects and advantages of the invention will become apparent throughout the course of the following description:—

In the accompanying drawings, wherein for the purpose of illustration is shown a preferred embodiment of my invention, and wherein like reference characters designate like parts throughout:—

Figure 1 is a plan view of a cultivator embodying my invention;

Fig 2 is a side elevation thereof;

Fig. 3 is a side elevation partly in section of the yoke detached;

Fig. 4 is a plan view of the yoke detached;

Fig. 5 is a sectional view showing the mounting of the ground working members upon the shafts;

Fig. 6 is a detail sectional view showing the mounting of the inner ends of the shafts, and Fig. 7 is a detail sectional view partly in elevation of the caster wheel mounting employed at the forward end of the frame.

Referring now more particularly to the drawings, the numeral 10 indicates the main frame of a disk cultivator of the usual construction, which frame has pivotally connected thereto gangs or sections A of disks. The main frame 10 is in the majority of cultivator construction with which I am familiar provided with a forward extension 11 which forms a mounting for the forward or supporting caster wheels and clevis by means of which the cultivator is attached to the draft. Upon this extension frame are mounted in the usual manner the adjusting levers $11^a$ by means of which the positioning of the gangs A is controlled.

In applying my invention to a cultivator frame of this construction I employ a brace $10^a$ connecting the main frame 10 and the forward extension 11 thereof to rigidify the extension 11. To this extension I then bolt or secure in any desired manner an attachment frame 12, to the forward end of which I firmly bolt the member 13. This member 13 embodies bearings for the shaft 14 which is supported by caster wheels 15, the shaft being vertically adjustable to any desired position in order that the height of the forward end of the cultivator may be regulated as desired with respect to the ground over which the same is passing. The shaft 14 likewise forms a mounting for the usual clevis 16.

To the member 13, as at $13^a$, I pivot a yoke $16^a$ for vertical swinging movement, the yoke being disposed beneath the attachment frame 12. This yoke embodies an outer substantially annular section 17 and centrally extending portions 18 disposed longitudinally of the yoke and substantially diametrically of the outer section 17 thereof. Intermediate the central portions 18 is pivotally mounted the lower end of a link 19, the upper end of which is pivotally connected as at 20 to the operating arm 21 of the hand lever 22 which coöperates in the usual manner with a segment 23 mounted upon the attachment plate 12. It will be obvious that by adjusting the lever 22, the yoke $16^a$ may be swung about its pivot in order to adjustably alter the spaced relation of the rear end of the yoke from the ground.

Upon the sides of the members 18 adjacent the rear end of the yoke, I mount vertically disposed bearings 24 through which are directed attaching members 25, the attaching member being rotatable in bearings 24. To the lower ends of these attaching members I pivotally connect the inner ends of the shafts 26. It will be obvious that the shafts 26 are capable of swinging movement in a horizontal direction and in a vertical direction.

Upon the outer section 17 of the yoke, at each side thereof, I mount a bearing support 27, each of which is provided at its lower end with the bearing 28 through which the shaft is directed, the bearing being sufficiently loose to admit of angular play of the shaft. The support 27 is provided with spaced vertical slots 29, which coact with longitudinal slots 30 formed in the side members 17 for the reception of securing members 31. It will be obvious that by loosening the securing members and by adjusting the supports 27, the shafts 26 may be angularly positioned in both vertical and horizontal directions.

Upon the outer end of the shafts 26, beyond the bearings 28, I mount sleeves 32, each of which has secured thereto disks 33. The sleeve 32 is longitudinally adjustable upon the shaft 26 and is held in adjusted position by means of stop collars 34. The sleeve 32 is, however, rotatable upon the shaft and may be supplied with lubrication in any desired manner, as indicated at 35.

In the use of my device, the disks 33 serve to break up the ridges of the earth through which the cultivator is passing and are, accordingly, so adjusted upon the shafts 26 as to aline with a pair of such ridges. These ridges are usually uniformly spaced and consequently a single adjustment for width is usually all that is necessary. By adjusting the bearings of the shafts 26, the rake or drag of the disks may be regulated as desired, and by adjustment of the lever 22 the vertical positioning of the yoke 16ª may be altered so that the disks 33 get into the ground a requisite distance to break up the ridge. This vertical adjustment likewise permits of compensation for adjustments of the shaft 14 at the forward end of the frame. The lever 22, furthermore, performs the function of permitting elevation of the disks to prevent their contact with the ground when desired. In Fig. 1 the lister ridges are designated by the lines R, and it will be noted that the ground-working implements throw the earth from the ridges into a furrow between a pair of adjacent ridges. The earth removed from the ridges by the disks 33 leaves a small portion of the ridge which is thrown into the furrows at the outer sides of the ridges being acted upon by the disks of the gangs A. Where the furrow between the ridges is wider so that the ridges are farther spaced apart, as indicated by the lines R', the adjustment of the disks 33 upon the shafts 26 will compensate for this difference.

When it is desired to employ the machine as a simple disk harrow the bolts $a$ and $b$ securing the attachment frame 12 to the extension 11 are removed and the attachment frame slid rearwardly upon the extension and again secured in position employing the opening $c$ and the opening formerly occupied by the bolt $a$.

From the foregoing it will be obvious that I have constructed an attachment for cultivators whereby ridge grooves may be readily broken and leveled; and it will likewise be obvious that the construction of the same as hereinbefore set forth is capable of some change without departing from the spirit of my invention. I, accordingly, do not limit myself to the specific structure as hereinbefore set forth, except as so limited by the sub-joined claims.

What I claim is:—

1. The combination with a cultivator embodying gangs of ground-working members, with a forwardly extending supporting frame secured thereto, a yoke pivotally connected with the forward end of said frame, means for vertically adjusting the free end of said yoke, oppositely extending shafts carried by said yoke and ground working members mounted upon said shafts.

2. The combination with a cultivator, of a forwardly extending supporting frame secured thereto, a yoke pivotally connected with the forward end of said frame, means for vertically adjusting the free end of said yoke, oppositely extending vertically and horizontally adjustable shafts carried by said yoke and ground working members longitudinally adjustable upon said shafts.

3. The combination with a cultivator, of a forwardly extending supporting frame secured thereto, a caster wheel mounting secured to the forward end of said frame, a yoke having its forward end pivotally connected with said caster wheel mounting, said yoke embodying an outer substantially annular section and a central section extending diametrically thereof and longitudinally of the cultivator, shafts having their inner ends pivotally connected with said inner section at opposite sides thereof for universal movement, bearings for said shafts mounted upon said outer annular section and adjustable vertically and circumferentially thereon and ground working members mounted upon said shafts.

4. The combination with a cultivator, of a forwardly extending supporting frame secured thereto, a caster wheel mounting secured to the forward end of said frame, a yoke having its forward end pivotally connected with said caster wheel mounting, said yoke embodying an outer substantially annular section and a central section extending diametrically thereof and longitudinally of the cultivator, shafts having their inner ends pivotally connected with said inner section at opposite sides thereof for universal movement, bearings for said shafts mounted upon said outer annular section and adjustable vertically and circumferentially thereon, ground working members mounted upon said shafts and means for vertically adjusting the rear end of said frame.

5. The combination with a cultivator, of a forwardly extending supporting frame secured thereto, a caster wheel mounting secured to the forward end of said frame, a yoke having its forward end pivotally connected with said caster wheel mounting, said yoke embodying an outer substantially annular section and a central section extending diametrically thereof and longitudinally of the cultivator, vertical bearings secured to said central section at opposite sides thereof, supporting members rotatably mounted in said bearings, bearings for said shafts mounted upon said outer annular section and adjustable vertically and circumferentially thereon and ground working members mounted upon said shafts.

6. The combination with a cultivator, of a forwardly extending supporting frame secured thereto, a yoke pivotally connected with the forward end of said frame, means for vertically adjusting the free end of said yoke, oppositely extending shafts carried by said yoke, sleeves rotatably mounted upon said shafts, adjustable stop collars likewise carried by said shafts and abutting the ends of said sleeves and ground working members carried by said sleeves.

7. The combination with a cultivator embodying a forward extension, of a forwardly extending supporting frame longitudinally adjustably mounted upon said extension, a yoke removably and pivotally mounted at the forward end of said frame, means for vertically adjusting the free end of the yoke oppositely, extending shafts carried by said yoke, and ground working members mounted on said shafts.

8. The combination with a cultivator, of a forwardly extending supporting frame secured thereto, transversely extending members adjustably secured to said supporting frame, and ground-working elements mounted upon said shaft.

9. The combination with a cultivator, of a forwardly extending supporting frame secured thereto, transversely extending shafts secured to said supporting frame, and ground-working disks adjustably mounted upon said shafts.

10. In a device for cultivating listed ground, and in combination a cultivator embodying gangs of earth working elements adapted to direct the earth engaged thereby outwardly from the center of the cultivator, and means extending forwardly from the cultivator for engaging adjacent lister ridges and directing a portion of the earth forming the same into the furrow therebetween.

In testimony whereof I hereunto affix my signature.

DANIEL W. SCHMITT.